United States Patent
Brederlow et al.

(10) Patent No.: US 7,429,001 B2
(45) Date of Patent: Sep. 30, 2008

(54) LABEL IDENTIFICATION SYSTEM AND CODING METHOD SUITED THEREFOR

(75) Inventors: Ralf Brederlow, Poing (DE); Christian Pacha, München (DE); Roland Thewes, Gröbenzell (DE); Werner Weber, München (DE)

(73) Assignee: Infineon Technologies, Munich (DE)

( * ) Notice: Subject to any disclaimer, the term of this patent is extended or adjusted under 35 U.S.C. 154(b) by 675 days.

(21) Appl. No.: 10/504,376

(22) PCT Filed: Feb. 12, 2003

(86) PCT No.: PCT/DE03/00405

§ 371 (c)(1),
(2), (4) Date: Feb. 22, 2005

(87) PCT Pub. No.: WO03/069539

PCT Pub. Date: Aug. 21, 2003

(65) Prior Publication Data

US 2005/0116037 A1    Jun. 2, 2005

(30) Foreign Application Priority Data

Feb. 14, 2002  (DE) ............................... 102 06 137

(51) Int. Cl.
*G06K 19/06* (2006.01)
*G06K 7/08* (2006.01)
*H04Q 5/22* (2006.01)
(52) U.S. Cl. ............... 235/492; 235/451; 340/10.4
(58) Field of Classification Search ............... 235/451; 340/572.2, 572.4, 10.2, 10.3, 10.33, 10.4, 340/10.41
See application file for complete search history.

(56) References Cited

U.S. PATENT DOCUMENTS

| | | | | |
|---|---|---|---|---|
| 3,299,424 A | * | 1/1967 | Vinding | 340/10.3 |
| 5,491,468 A | * | 2/1996 | Everett et al. | 340/10.34 |
| 6,778,070 B1 | * | 8/2004 | Thomas | 340/10.1 |
| 6,914,518 B1 | * | 7/2005 | Gerber et al. | 340/10.4 |
| 7,106,174 B1 | * | 9/2006 | Powell | 340/10.2 |
| 2002/0149480 A1 | * | 10/2002 | Shanks et al. | 340/572.1 |

FOREIGN PATENT DOCUMENTS

| | | |
|---|---|---|
| EP | 0 578 701 | 10/1999 |
| JP | 06029885 | 2/1994 |
| JP | 08172378 | 7/1996 |
| WO | WO 99/25103 | 5/1999 |

OTHER PUBLICATIONS

Japanese Office Action for Patent Application No. 2003-568593 mailed Mar. 20, 2007 (9 pgs.).

* cited by examiner

*Primary Examiner*—Jared J Fureman
(74) *Attorney, Agent, or Firm*—Dicke, Billig & Czaja, PLLC

(57) ABSTRACT

The invention relates to a label identification system comprised of a transmitting-receiving unit and of identification labels on which the identification information is stored in the form of a digital identification information word. The provision of a circuit on the identification label in the form of a circuit arrangement, which is prefabricated using a polymer technique and on which the identification information is subsequently placed by the offset printing of conductor tracks, enables the provision of an identification label involving a minimal consumption of energy during inexpensive mass production. The bulk of the identification information processing is transferred to the transmitting-receiving unit.

20 Claims, 3 Drawing Sheets

LABEL IDENTIFICATION SYSTEM AND CODING METHOD SUITED THEREFOR

Cross Reference to Related Application

This Utility Patent Application claims the benefit of the filing date of German Application No. DE 102 06 137,8. filed Feb. 14, 2002, and International Application No. PCT/DE03/00405, filed Feb. 12, 2003, both of which are herein incorporated by reference.

BACKGROUND

The invention relates to a label identification system with a transmitting-receiving unit emitting a periodically alternating magnetic field through a primary coil and an identification label, which stores a digital identification information word on a bit basis and, fed by inductive coupling with the alternating magnetic field sent by the transmitting-receiving unit, outputs the stored identification information with a delay by corresponding modulation of the energy content of the transmission magnetic field, relates to an identification label which can be used for this and also relates to a coding method which can be used for such a label identification system.

Label identification systems consequently cover various types of applications, such as for example the identification of barcodes on price tags, the detection of identification information in stickers on cases for baggage distribution at airports or the identification of identification information in chip cards which are used for storing the amount of feed in intensive livestock farming. The identification labels used for this are commonly referred to as ID tags. In almost all cases, the identification labels are read wirelessly. Important criteria for the functionality of a label identification system is the range and positional dependence of the transmitting-receiving system. In this respect, on the one hand a great range and on the other hand a small positional dependence of the system are desirable. Moreover, the identification labels must in most cases (for example in hypermarkets) be produced at extremely low cost.

Furthermore, it is desirable whenever possible to apply the information to the identification labels only at the premises of the end user, and in the end to read this information reliably.

The prior art discloses label identification systems with great positional flexibility and range which have until now been produced as integrated silicon circuits with an integrated flash memory. On account of their relatively high price, such silicon circuits are suitable only for a small selection of applications, so that currently laser scanners are used at the supermarket checkout for the identification information that is applied to an identification label, for example in the form of a barcode, to be detected, de-inventorized and the price determined from it. Although, for this purpose, the barcodes to be applied to the label or the product can be printed on inexpensively, costing only fractions of cents, on the other hand the process of reading such barcodes takes place serially and is so far only possible at reasonable prices with human assistance.

It is accordingly desirable to provide a label identification system which operates electrically without human assistance, with identification labels which can be produced inexpensively. On the one hand an increasing number of label identification system applications would like to use the price advantages of mass production, but on the other hand the necessary precondition for this is that the integrated circuits required for the identification labels are produced much less expensively than at present. These requirements can only be partly satisfied by increases in productivity and smaller chip surface areas. The integrated silicon circuits with the low functionality necessary for many of these new applications would be limited however not by the scalable circuit but by the poorly scalable tags. Consequently, in order to open up new mass markets for label identification systems, the process on which the IC production is based must also be simplified.

An alternative for drastically lowering the production costs of integrated circuits consists from the current viewpoint in the use of novel, extremely inexpensive production processes, such as for example printed polymer transistors. In the simplest case, the circuits of the current integrated silicon circuits would in this case simply be transferred to a production process creating polymer transistors. However, this leads to a whole series of new problems. For example, it is not possible, at least from the current viewpoint, to produce powerful polymer-based n-MOS field-effect transistors, as are required for CMOS circuits. It must also be expected that, on account of the much poorer mobility of the charge carriers in the polymers, the power consumption of the polymer transistor circuits will be many times higher than that of the current CMOS circuits. Nonvolatile memories based on a polymer technique are likewise not available at present.

SUMMARY

One embodiment of the present invention is to introduce a label identification system comprising a transmitting-receiving unit and identification labels which has minimal energy consumption requirements and requirements for the electronics of the identification labels, in that the bulk of the information processing is transferred to the transmitting-receiving unit. Also, an embodiment of the invention provides a coding method with which the information can be easily configured by the end user on the identification label.

According to a first embodiment, a label identification system according to the invention is characterized in that the transmitting-receiving unit has detection means, which are connected to the primary coil and serve for detecting the energy content of the transmission magnetic field, and decoding means, which decode the identification information modulated onto the alternating magnetic field from the identification label, on the basis of a change in the energy content of the alternating magnetic field respectively detected by the detection means and on the basis of the respectively detected time delay of this change, and from this determine the identification information as a binary code.

In order to lower the energy consumption, the identification label stores the energy taken from the emitted alternating field over at most one period of the alternating field.

In the identification label, each bit of the identification information corresponds to an integral multiple of a known base energy amount dependent on the position and the distance of the identification label from the transmitting-receiving unit. This integral multiple may be in each case $2^i$ times the base energy amount, i indicating the bit position in the identification information word.

This base energy amount is calibrated by emitting a likewise position-dependent reference signal from the identification label, this reference signal quantifying the amount of the buffer-stored energy of the identification label corresponding to the identification information. The calibration takes place in this case in the transmitting-receiving unit.

In one form, the alternating magnetic field emitted by the transmitting-receiving unit is sinusoidal, the identification information from the identification label in this case being modulated onto one half-wave and the reference signal being modulated onto the neighboring other half-wave of the sinusoidal oscillation.

Apart from the secondary coil that can be inductively coupled with the alternating magnetic field emitted by the transmitting-receiving unit, the identification label, which can be used for such a label identification system, has an electrical memory unit for storing the identification information on a bit basis as a binary code and switching means for connecting the secondary coil to the memory unit. The memory unit in the identification label buffer-stores the energy taken from the secondary coil only during one half-wave of the alternating field, and the energy corresponding to the identification information stored in the identification label or the memory unit is transmitted again during the other half-wave of the alternating field.

The memory unit of the identification label has n storage transistors, connected with the source and/or drain in parallel, for storing an n-place binary identification information word. Each storage transistor consequently corresponds to one bit of the identification information word. In addition, the memory unit has a further storage transistor for storing the reference signal.

In this memory unit, the bit position of the identification information word is fixed by the corresponding width of a respective storage transistor and the logic state of each bit position by the contacting of the respective storage transistor. If the transistors storing the identification information are realized as polymer transistors, the conductor tracks of the storage transistors that determine the contacting can be produced by offset printing and also at a later point in time than the rest of the identification label.

According to another embodiment, the invention makes possible a coding method for an item of identification information to be transmitted in a label identification system from an identification label in the form of a binary word by inductive coupling of a periodically alternating magnetic field emitted by a primary coil of a transmitting-receiving unit by means of a secondary coil connected to the identification label, this identification information being stored in the identification label and output with a delay by a corresponding modulation of the energy content of the transmission magnetic field.

This coding method is characterized in that each bit of the identification information is coded in such a way that it corresponds to $2^i$ times a known base energy amount dependent on the position and the distance of the identification label from the transmitting-receiving unit.

In one embodiment, the coding method is characterized in that, in the case of a sinusoidal alternating magnetic field, the base energy amount is calibrated in the transmitting-receiving unit by a likewise position-dependent reference signal which is emitted from the identification label during a half-wave and is quantified by the amount of energy corresponding to the identification information and buffer-stored in the identification label during the neighboring half-wave.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
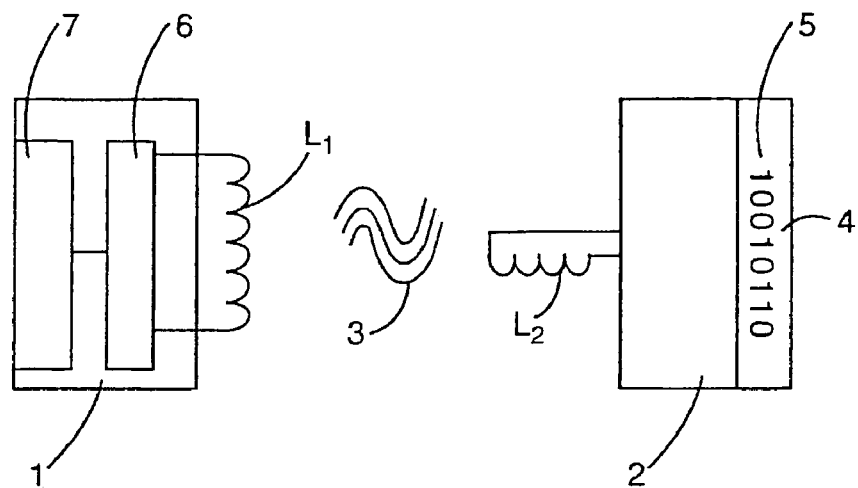
FIG. 1 schematically illustrates functional blocks of a label identification system according to the invention.

According to the functional block diagram schematically represented in FIG. 1, a transmitting-receiving unit 1 emits an alternating magnetic field 3 through a primary coil L1. An identification label 2 has a secondary coil L2, which is inductively coupled with the alternating field 3. Stored in a memory unit 4 of the identification label 2 is a binary identification information word 5, which in the example represented has eight bit positions.

The transmitting-receiving unit 1 also has detection means 6, which are connected to the primary coil L1 and serve for detecting the energy content of the transmission magnetic field 3, and decoding means 7, which decode the identification information transmitted from the identification label 2, on the basis of a corresponding respectively detected change in the energy content of the magnetic field and on the basis of a respectively detected time delay of this change, and from this determine the identification information as a binary code.

A boundary condition for the wireless transmission of data is the protocol, that is, the manner in which the data are coded before the transmission and later decoded again. Since one embodiment of the present label identification system is intended to be a product with least possible production costs, the decoding effort is to be concentrated on the transmitting-receiving unit, which is required in far smaller numbers than the identification labels.

According to the above description, an alternating magnetic field is emitted on the transmitter-receiver side through a primary coil L1 at a frequency authorized by the postal authorities, for example 125 kHz. The detection means 6 of the transmitting-receiving unit 1 at the same time detect the energy content of the magnetic field, for example on the basis of the current required for a constant transmission voltage.

The identification label 2 modulates this energy content by conversion of magnetic energy into electrostatic energy and back into magnetic energy at a later point in time. The individual bit positions are coded by the amount of magnetic energy taken from the magnetic field by the identification label and by the time delay of the conversion of this energy back into magnetic energy. Each bit i set in the identification label corresponds to a multiple, for example $2^i$, of a base energy amount, which however depends on the position and the distance of the identification label from the transmitter. If the total energy is related to the base energy amount corresponding to one bit, a characteristic number is obtained from the entire energy content. The number can be recalculated directly into a binary code, which in turn corresponds to the values of the individual memory bits in the identification label. However, the base energy amount mentioned must be known under the boundary conditions mentioned.

Since an exact distance and a defined position of the secondary coil L2 with respect to the primary coil L1 cannot be ensured, a reference signal which in the same way as the memory content is position-dependent and with which the amount of energy buffer-stored in the identification label can be quantified is required. This reference signal may then be modulated onto the positive or negative half-wave of the alternating magnetic field 3, while the memory content is coded onto the neighboring negative or positive half-wave of the same oscillation of the alternating field. However, some other phase division of the signals is alternatively also conceivable. In this way, the coding method is independent of the distance and position of the pair of coils L1, L2. If the transmission energy is converted twice, i.e. the magnetic energy into electrical energy and the electrical energy into magnetic energy, within one period, i.e. during a period of oscillation of the alternating magnetic field 3, it is also possible for the bit signals to be generated by a simple and energy-efficient circuit arrangement on the identification label.

Figure 2:
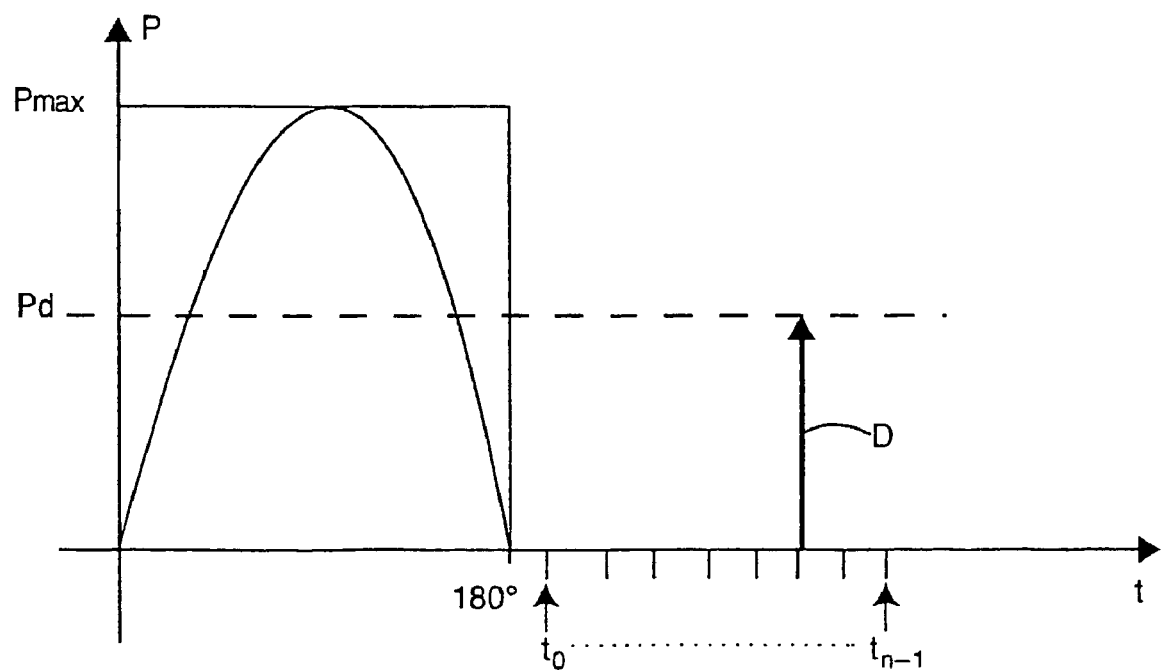
FIG. 2 illustrates a diagram which explains the decoding of the identification information in the transmitting-receiving unit of the label identification system according to the invention.

In FIG. 2, which represents the power output P of the alternating magnetic field as a function of time t and schematically illustrates the decoding method carried out in the transmitting-receiving unit, represented on the left is the first half-wave of a periodic, for example sinusoidal, alternating signal with the maximum power output $P_{max}$ and represented on the right, on the time axis, within a second half-wave (not shown), is a detection signal D with an energy content corresponding to a power output $P_d$, which is detected according to one of n delay times $t_0, \ldots, t_{n-1}$. As mentioned, the decoding means 7 in the transmitting-receiving unit 1 decode the identification information on the basis of the energy content, indicated by $P_d$, of the detection signal D and of the time slot corresponding to the respective delay time in which this signal D occurs, and generate the decoded information in the form of a binary code.

The construction and function of a circuit arrangement in an identification label according to one embodiment of the invention is described below on the basis of FIG. 3. The circuit only requires energy for the transmission of the memory content, but not for peripheral circuit functions. Since, in the wirelessly operating label identification system, the identification label can only be supplied with energy from the alternating magnetic field 3 via the secondary coil L2, this energy is primarily also present in the identification label as alternating-current voltage or alternating current. However, classic circuitry functions with direct-current voltages or direct currents are also possible. The coding method proposed according to one embodiment of the invention avoids the loss-prone rectification of the primary energy. The energy of the individual half-waves is buffer-stored by the circuit and re-transmitted in a changed form corresponding to the identification information word contained in the identification label. If the current or voltage signal generated by the secondary coil L2 is used directly as the clock, control and input signal, it is not even necessary to apply constant supply voltages to the transistors.

The transmission of the identification information word from the identification label to the transmitting-receiving unit takes place by means of the modulation of the electrical resistance between the ends A and B of the secondary coil L2 and the center tap of the same, connected to ground E. This modulation leads to a variable mutual induction in the primary coil L1 (not represented in FIG. 3) and consequently to a correspondingly modulated current in the same. This modulation is then detected by means of a current measurement in the primary circuit of the transmitting-receiving unit. Consequently, the modulation of the resistance of the secondary coil L2 is transmitted to the transmitter by the mutual induction that has taken place.

Figure 3:
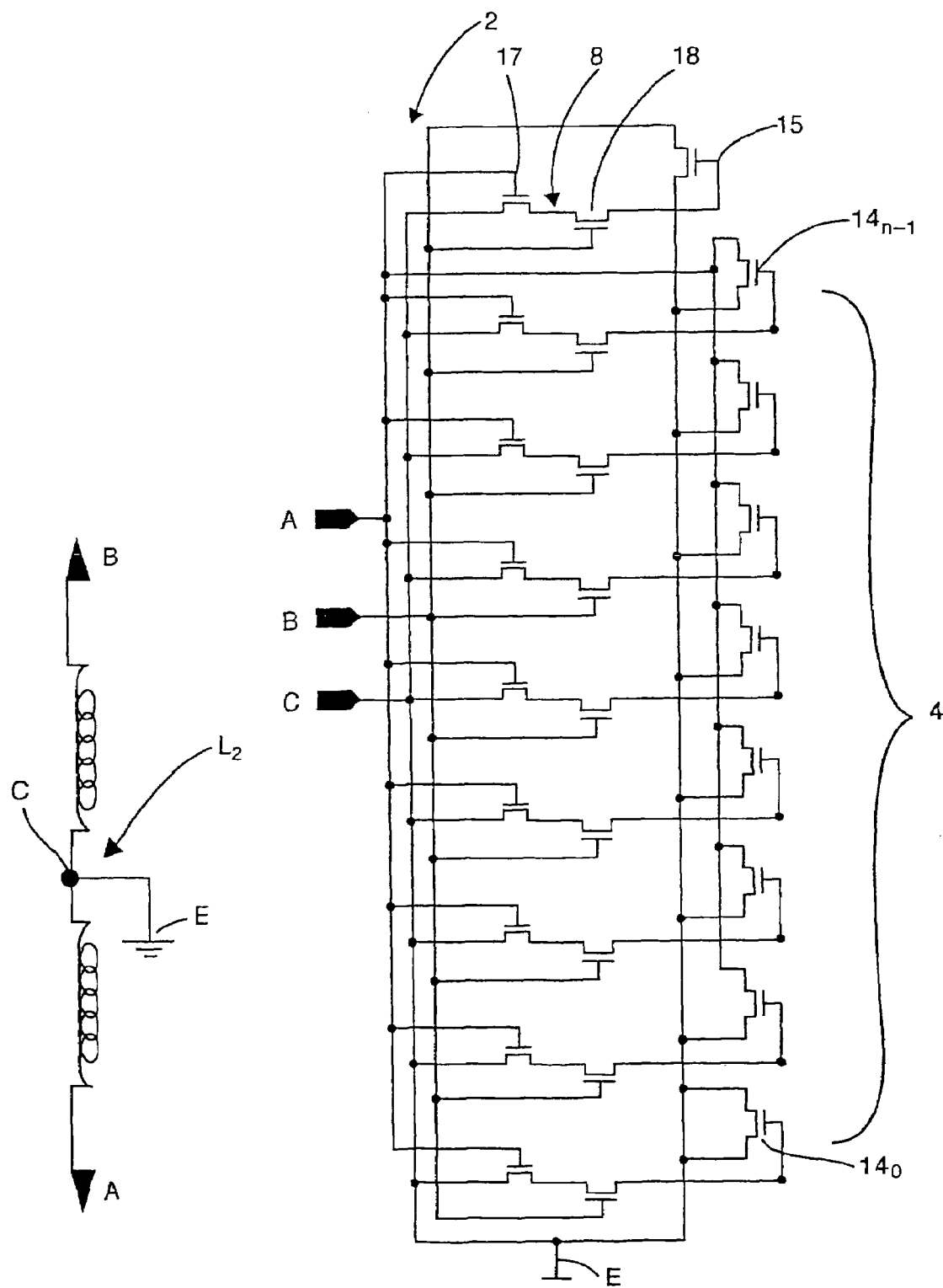
FIG. 3 illustrates an exemplary embodiment of a circuit for an identification label which can be used in the case of the invention.

The right-hand part of FIG. 3 represents a simple circuit arrangement for the modulation of the resistance in the secondary coil L2, which is connected by both its outer ends A and B to the terminals A and B of the circuit arrangement.

The circuit arrangement of FIG. 3 manages with a single type of MOS transistors, for example with polymer transistors of the p type. The aforementioned boundary conditions are satisfied in the case of the circuit arrangement illustrated in FIG. 3: the change in resistance or the current consumption are determined almost exclusively by the storage transistors $14_0$-$14_{n-1}$ and the reference transistor 15 of the memory unit 4. The circuit arrangement illustrated in FIG. 3 can be divided into three parts for better understanding. The first part, on the left and designated by the reference numeral 8, is a driving circuit. It comprises two transistors 17, 18 for each memory bit of the identification information memory 4 and for the reference transistor 15. The source terminals of the first transistors 17 are commonly connected to the center tap C and the gate terminals of the same are commonly connected to the lower end A of the secondary coil L2. The drain terminal of each of the first transistors 17 is respectively connected to the source terminal of one of the second transistors 18. Its gate terminals are commonly connected to the upper end B of the secondary coil L2, while the drain terminals of each second transistor 18 are respectively connected to the gate terminal of a respective storage transistor $14_0$-$14_{n-1}$ or reference transistor 15. Since the two outer ends A and B of the secondary coil L2 are phase-shifted by 180° in the voltage signal, one of the two driving transistors 17, 18 is always below the threshold voltage and consequently in the cutoff region. A current flow between the center tap of the secondary coil L2 and the gate of the storage transistor is possible only by means of displacement currents. Such displacement currents are produced however by the alternating-current voltages applied by the secondary coil L2 at the gate electrodes of the two driving transistors 17 and 18. They ultimately lead to charge displacements on the gates of the storage transistors $14_0$-$14_{n-1}$, so that alternately positive and negative gate voltages are present there between source and gate. This causes a change between high conductivity and low conductivity on the storage transistors and a reference transistor 15. If the drains (sources) of the storage transistors $14_0$-$14_{n-1}$ are commonly connected to the upper (alternatively the lower) outer coil terminal B (A) and the reference transistor 15 is connected to the other outer coil terminal, respectively, A (B), the storage transistors $14_0$-$14_{n-1}$ determine for one half-wave and the reference transistor 15 determines for the other half-wave of the alternating magnetic field the conductivity of the entire circuit connected to the secondary coil L2.

The coding of a respective storage transistor i is obtained from its width $2^i$, that is to say the size of the change in resistance, and consequently the position of the bit in the digital identification information word, is determined by the different widths of the transistors. The logic state can be fixed by the contacting of the storage transistors $14_0$-$14_{n-1}$ (terminal of the drain to ground means "0"; terminal of the drain to the upper (or lower) outer coil terminal A, B means "1"). The reference transistor 15 should have as far as possible the width of an average bit of the storage transistors, and its drain terminal must be connected to the lower (or upper) outer coil terminal A (or B) of the secondary coil L2.

Figure 4:
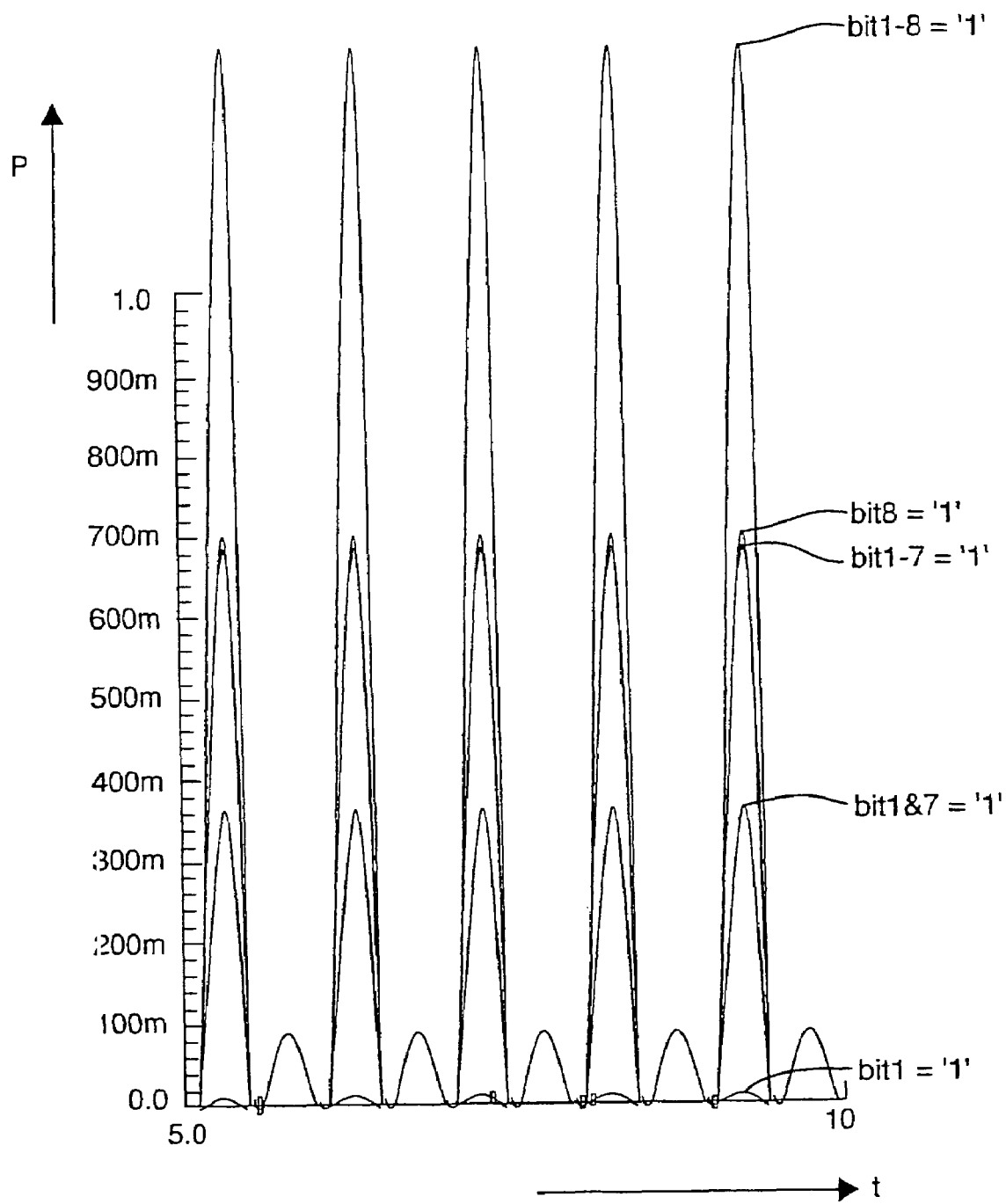
FIG. 4 illustrates a diagram of a simulation result, which illustrates the power output over time for various bit combinations in the memory of the identification label.

FIG. 4 illustrates a diagram of a simulation of the resultant power consumption of the circuit represented in FIG. 3 for different bit combinations or digital words. FIG. 4 also illustrates that the circuit arrangement of FIG. 3 is not yet optimal with regard to the distinguishability of the bit 8="1" and of the bits 1 to 7 equal to "1", since the power values of these bit combinations lie very close to one another. The power consumption of the second half-wave, not designated any more specifically, indicates the reference signal generated by the reference transistor 15.

For the production of an identification label with the circuit arrangement illustrated in FIG. 3, it is necessary to code the information which the label is intended to contain for this. In order to make this coding cost as little as possible, it is possible to prefabricate the identification label in inexpensive mass production as far as possible, up to the step determining the information. In the case of the circuit arrangement illustrated in FIG. 3, only the drain connecting line of the storage transistors $14_0$-$14_{n-1}$ is responsible for the content of one bit, that is to say logical "0" or logical "1", while the rest of the circuit is independent of the memory content. It is consequently sufficient if only the terminals of the transistors $14_0$-$14_{n-1}$ forming the identification information memory 4 are connected to the lines corresponding to the logic state "0" or "1" by the end user in a way corresponding to the memory content. This will take place by inexpensive and simple offset printing of these conductor tracks. However, it is a precondition that the production process of the circuit (in one embodiment using a polymer technique) makes it possible to apply a line to the prefabricated circuit by such a printing process or a similar printing process.

In the case of the label identification system according to one embodiment of the invention, the information of an identification label is decoded on the basis of the power consumption of the primary coil 1 in the alternating magnetic field of the transmission signal. Furthermore, the signals are coded on the basis of the amplitude, phase or shape of a half-wave of the transmission signal. So that they can be decoded location-independently, the calibration of the location-dependent signals takes place by a reference signal on the other half-wave of the transmission signal.

The circuit which is necessary on the identification label for storing the identification information and for driving purposes is prefabricated using a very low-cost polymer technique and the conductor tracks determining the information content of the identification label are applied by the offset printing process after implementation of the circuit.

What is claimed is:

1. A label identification system comprising:
a transmitting-receiving unit emitting a periodically alternating magnetic field through a primary coil; and
an identification label which stores a digital identification information word on a bit basis and, fed by inductive coupling with the alternating magnetic field sent by the transmitting-receiving unit, outputs the stored identification information with a delay by corresponding modulation of the energy content of the transmission magnetic field;
wherein the transmitting-receiving unit has detection means, which are connected to the primary coil and serve for detecting the energy content of the transmission magnetic field, and decoding means, which decode the identification information modulated onto the alternating magnetic field from the identification label, on the basis of a change in the energy content of the alternating magnetic field detected by the detection means and on the basis of the respectively detected time delay of this change, and from this determine the identification information as a binary code.

2. The label identification system of claim 1, wherein each set bit of the identification information word corresponds to an integral multiple of a known base energy amount dependent on the position and the distance of the identification label from the transmitting-receiving unit.

3. The label identification system of claim 2, wherein the multiple is in each case $2^i$ times the base energy amount, where i indicates the bit position in the identification information word.

4. The label identification system of claim 2, wherein the base energy amount is calibrated in the transmitting-receiving unit by a likewise position-dependent reference signal which is emitted from the identification label and quantifies the amount of the buffer-stored energy of the identification label corresponding to the identification information.

5. The label identification system of claim 1, wherein the alternating magnetic field emitted by the transmitting-receiving unit is sinusoidal and in that the memory content of the memory specifying the identification information word of the identification label is modulated onto one half-wave and the reference signal is modulated onto the neighboring other half-wave of the sinusoidal oscillation.

6. The label identification system of claim 1, the identification label further comprising:
a secondary coil, which can be brought into the alternating magnetic field emitted by the transmitting-receiving unit and can thereby be inductively coupled with said field;
an electrical memory unit for storing the identification information on a bit basis as binary code; and
switching means for connecting the secondary coil to the memory unit, the memory unit buffer-storing the energy taken from the secondary coil only during one half-wave of the alternating field, and the energy corresponding to the identification information stored therein being transmitted again during the other half-wave of the alternating field by means of the switching means and the secondary coil.

7. The label identification system of claim 6, wherein the memory unit has n storage transistors, connected with their source or drain terminals in parallel, which respectively correspond to one bit of the n-place binary identification information word.

8. The label identification system of claim 7, wherein the memory unit has an additional storage transistor, connected in parallel with the n storage transistors, for storing the reference signal.

9. The label identification system of claim 8, wherein the transistors of the identification label are realized as polymer transistors.

10. The label identification system of claim 8, wherein the conductor tracks of each storage transistor that determine the contacting are produced by offset printing.

11. The label identification system of claim 7, wherein the location of the respective bit of the identification information word is fixed by the corresponding width of each and every storage transistor.

12. The label identification system of claim 7, wherein the logic state of each bit of the identification information word is fixed by the contacting of the source or drain terminal of the respective storage transistor.

13. A coding method for an item of identification information to be transmitted in a label identification system from an identification label in the form of a binary word, comprising:
- inductive coupling a periodically alternating magnetic field emitted by a primary coil of a transmitting-receiving unit with a secondary coil connected to the identification label;
- storing the identification information in the form of a binary word in the identification label and outputting with a delay by a corresponding modulation of the energy content of the transmission magnetic field; and
- coding each bit of the identification information in such a way that it corresponds to $2^i$ times a known base energy amount dependent on the position and the distance of the identification label from a transmitting-receiving unit, where i indicates the bit position in the identification information word.

14. The coding method of claim 13, wherein in the case of a sinusoidal alternating magnetic field, the base energy amount is calibrated in the transmitting-receiving unit by a likewise position-dependent reference signal which is emitted from the identification label during a half-wave and is quantified by the amount of energy corresponding to the identification information and buffer-stored in the identification label during the neighboring half-wave.

15. A label identification system comprising:
- a transmitting-receiving unit, which further comprises:
  - a primary coil emitting a periodically alternating magnetic field;
  - a detection circuit coupled to the primary coil; and
  - a decoder circuit coupled to the detection circuit; and
- an identification label, which further comprises:
  - a memory unit for storing a digital identification information word on a bit basis; and
  - a secondary coil that is fed by inductive coupling with the alternating magnetic field sent by the primary coil;
- wherein the identification label outputs the stored identification information with a delay by modulation of an energy content of a transmission magnetic field;
- wherein the detection circuit detects the energy content of the transmission magnetic field;
- wherein the decoder circuit decodes the identification information modulated into the transmission magnetic field from the identification label on the basis of a change in the energy content of the transmission magnetic field detected by the detector circuit and on the basis of the respectively detected time delay of this change; and
- wherein the detector circuit determines the identification information as a binary code.

16. The label identification system of claim 15, wherein each set bit of the identification information word corresponds to an integral multiple of a known base energy amount dependent on the position and the distance of the identification label from the transmitting-receiving unit.

17. The label identification system of claim 16, wherein the multiple is in each case $2^i$ times the base energy amount, where i indicates the bit position in the identification information word.

18. The label identification system of claim 16, wherein the base energy amount is calibrated in the transmitting-receiving unit by a position-dependent reference signal.

19. The label identification system of claim 18, wherein the position-dependent reference signal is emitted from the identification label.

20. The label identification system of claim 19, wherein the position-dependent reference signal quantifies the amount of the buffer-stored energy of the identification label corresponding to the identification information.

* * * * *